Aug. 6, 1957 H. KATZUNG 2,801,865
CONTROL ARM AND SPRING ARRANGEMENT FOR VEHICLE SUSPENSION
Filed July 29, 1953

INVENTOR
HUGO KATZUNG
BY
Dicke, Fallon and Craig

United States Patent Office 2,801,865
Patented Aug. 6, 1957

2,801,865

CONTROL ARM AND SPRING ARRANGEMENT FOR VEHICLE SUSPENSION

Hugo Katzung, Stuttgart-Vaihingen, Germany, assignor to Daimler-Benz Aktiengesellschaft, Stuttgart-Unterturkheim, Germany Application July 29, 1953, Serial No. 370,984

3 Claims. (Cl. 280—124)

The present invention relates to an axle suspension for vehicles, particularly for motor vehicles, the axle being guided by parallel links swinging in the longitudinal direction of the vehicle and preferably linked, on the one hand, to the lower control arm, for example, by means of a central universal joint, and, on the other hand, to two lateral control arms allowing the axle to be yielding about the central universal joint.

It is an object of the present invention to provide an axle of a simple construction which also results in advantageous riding, driving and springing qualities of the vehicle, particularly in the case of highly loaded vehicles, for instance, busses equipped with double-tired wheels.

The present invention essentially consists in that the axle is sprung against the frame or the vehicle body, respectively, by pairs of coil springs or springs correspondingly arranged, which rest, on the one hand, against transverse members arranged in a lateral relation to the longitudinal center plane of the vehicle on either side of the axle, and, on the other hand, against abutments or brackets, respectively, provided at the frame.

In a preferred construction of the present invention a torsion bar is also provided as a stabilizer which, for example, is mounted on the transverse members of the axle and whose ends are linked to the frame, for example, by means of links comprising rubber blocks. These transverse members are preferably U-shaped, cranked and fastened with their central sections to the axle, and the branches thereof which are directed downwardly have at their ends horizontal flanges for supporting the coil springs.

The present invention is applicable to dead as well as to power axles. In the case of power axles an axle driving gear may be fitted to the axle for driving the road wheels by means of axle shafts arranged parallel to the axle.

Figure 1:
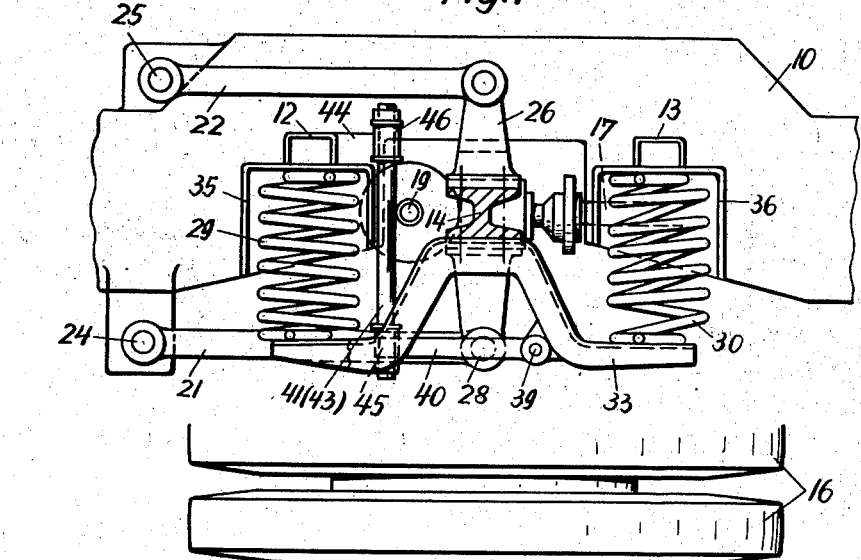
Figure 2:
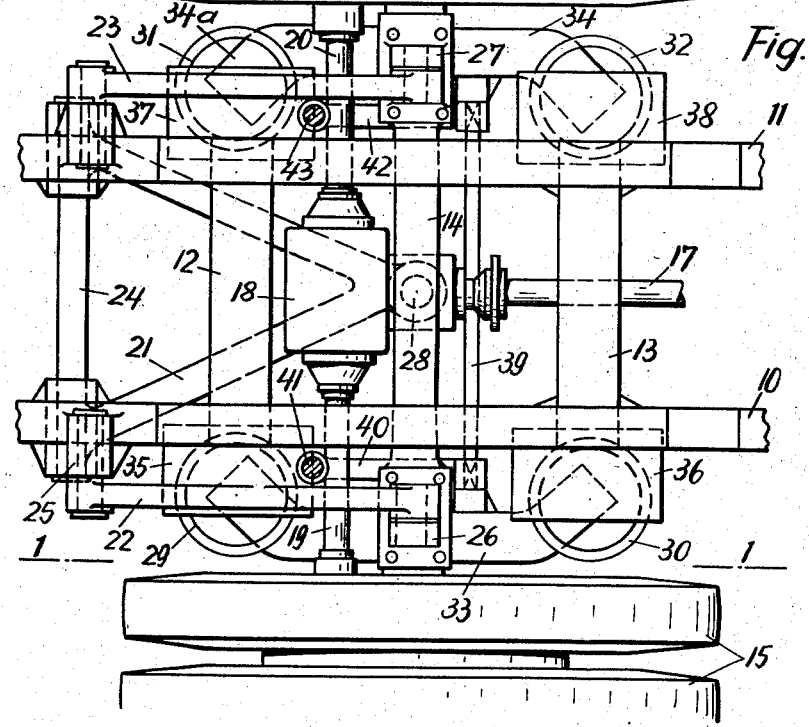

Further objects, features and advantages of the present invention will become more obvious from the following description when taken in connection with the accompanying drawing which shows, for purposes of illustration only, one embodiment in accordance with the present invention, and wherein:

Fig. 1 is a side view of an axle suspension according to the present invention, for instance, of a double-tired bus, sectioned along the line 1—1 of Fig. 2, and Fig. 2 is a plan view of the axle suspension.

The frame of the vehicle consists of the side members 10 and 11 and the cross members 12 and 13. As will be seen in Fig. 1, the side members 10 and 11 are cranked above the vehicle axle 14 on which the road wheels 15 and 16 are mounted. The road wheels are driven by the engine of the vehicle by way of a transmission gear—not illustrated herein—a propeller shaft 17, an axle gear 18 fastened to the axle 14, and the transverse shafts 19 and 20. In its central section the axle 14 is, for example, ring-shaped so as to receive the axle gear, and to be fastened therein in an appropriate way.

For guiding the axle, a V-shaped lower control arm 21 mounted on the shaft 24 for rotation about a transverse axis of the vehicle and two lateral upper arms 22 and 23 are provided, these control arms 22 and 23 being rotatably supported on the pins 25 at the side members 10 and 11 of the frame. For the functional connection of the upper arms to the axle there are brackets 26 and 27 provided on the axle 14. The pins 25 of the upper arms 22 and 23 may be supported by means of rubber members or ball joints, respectively, so as to allow the axle to be inclined in relation to the frame. The lower control arm 21 is connected with the axle 14 by a centrally arranged ball-and-socket joint 28.

The spring suspension of the axle consists of four coil springs 29, 30, 31, 32, the lower ends of which rest on the horizontal flanges provided at the end of the downwardly directed branches of the U-shaped cranked members 33, 34, whereas the upper ends of the coil springs are attached to the brackets 35, 36, 37 and 38 of the frame side members 10 and 11 at the ends of the transverse members 12 and 13. The members 33, 34, whose cross section is U-shaped, are fastened to the axle 4 with their central sections cranked upward.

Furthermore, a torsion bar 39 acting as a stabilizer is provided and supported at the U-shaped cranked members 33, 34, and connected to the frame side members 10, 11, for instance at 44, by means of the links 40, 41, and 42, 43, respectively. In the links 40, 41, and 42, 43 there are appropriately inserted rubber cushions 45 and 46, respectively.

In a similar manner, special shock absorbers may also be arranged, which are not illustrated in the drawings for the sake of clearness.

The axle suspension according to the present invention operates as follows:

Assuming each of the road wheels is moved up and down by the same amount and in the same direction, the coil springs 29, 30, 31, 32 will be uniformly stressed and balanced, respectively, in the direction of pressure. By doing so, the stabilizer 39 completely follows the up and down movements of the road wheels, too, without being stressed in torsion.

In the case of up and down movements of the road wheels in opposite directions, that is, with the axle in an inclined position in relation to the frame, the axle can swing about the ball-and-socket joint 28 of the lower control arm, the upper control arms 22 and 23 being able to follow such movement of the axle owing to their yielding connection or to their flexible nature, respectively. In this way transverse forces are received by the joint 28. Simultaneously the stabilizer 39 comes into operation so as to increase the springing capacity of the spring suspension, its one end being twisted by the link connection 40, 41 in relation to its other end guided by the link connection 42, 43.

With the stabilizer arranged at the axle 14 viz. at the transverse members 33, 34, the space between the side members of the frame is not needed by the stabilizer within the frame construction.

What I claim is:

1. In a motor vehicle with a frame and an axle, a suspension for said axle comprising means including two upper lateral control arms and a lower V-shaped control arm for suspending said axle from said frame, said upper control arms and said lower control arm being rotatably supported at said frame for rotation about an upper and a lower transverse axis respectively, the apex of said V-shaped control arm lying substantially in the central longitudinal plane of the vehicle, universal joint means for connecting said lower control arm at the apex thereof to said axle, said axle being provided with a plurality of spring abutment members extending substantially transversely to the axle, means including two helical springs for supporting said axle at said abutment members against said frame on both sides of said axle, a torsion rod constituting a stabilizer extending in the transverse direction of the vehicle and supported in said abutment members, and means including lever arms rigidly secured to said torsion rod at the points of support thereof in said members for yieldingly supporting said torsion rod on said frame, said last-named means including further lever arms and rubber members connecting said first-mentioned lever arms with said frame.

2. The combination according to claim 1 wherein said first-mentioned lever arms extend in the longitudinal direction of the vehicle and said second-mentioned further lever arms are substantially perpendicular to said first-mentioned lever arms.

3. In a motor vehicle the combination of a frame, an axle, a suspension for said axle comprising means including two upper lateral control arms extending rearwardly from said axle in the longitudinal direction of the vehicle and a lower V-shaped control arm for suspending said axle from said frame, said upper control arms being disposed in a plane essentially parallel to the plane of said lower control arm, means for pivotally supporting said upper control arms about an upper transverse axis in said frame and means for pivotally supporting said lower control arm at the open ends of the V about a lower transverse axis in said frame, universal joint means for directly connecting said V-shaped control arm along the apex thereof to said axle, means pivotally connecting said upper control arms directly to said axle at the ends thereof opposite the pivotal supports to said frame, said universal joint means of the V-shaped lower control arm and the pivot points of said upper control arms at said axle being disposed within a substantially vertical plane through said axle, said axle including spring abutment members extending transversely on both sides thereof and rigidly secured thereto, and means including two helical coil springs for supporting each side of said axle against said frame with each coil spring abutting on the one hand, against one of said abutment members and, on the other hand, against said frame.

References Cited in the file of this patent

UNITED STATES PATENTS

| | | |
|---|---|---|
| 2,226,047 | Borgward | Dec. 24, 1940 |
| 2,234,025 | Dellert | Mar. 4, 1941 |
| 2,300,844 | Olley | Nov. 3, 1942 |
| 2,369,501 | Wagner | Feb. 13, 1945 |

FOREIGN PATENTS

| | | |
|---|---|---|
| 997,430 | France | Sept. 12, 1951 |
| 519,877 | Great Britain | Apr. 9, 1940 |